US011749820B2

(12) United States Patent
Rainville (10) Patent No.: US 11,749,820 B2
(45) Date of Patent: Sep. 5, 2023

(54) FUEL CELL CATHODE AIR PRESSURE MANAGEMENT SYSTEMS

(71) Applicant: Bell Textron Inc., Fort Worth, TX (US)

(72) Inventor: Joseph Dean Rainville, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 222 days.

(21) Appl. No.: 17/339,572

(22) Filed: Jun. 4, 2021

(65) Prior Publication Data

US 2022/0393204 A1    Dec. 8, 2022

(51) Int. Cl.
| | |
|---|---|
| *H01M 8/04746* | (2016.01) |
| *B60L 50/70* | (2019.01) |
| *B60L 58/30* | (2019.01) |
| *B64D 41/00* | (2006.01) |
| *H01M 8/04111* | (2016.01) |
| *H01M 8/0438* | (2016.01) |

(52) U.S. Cl.
CPC ......... *H01M 8/04753* (2013.01); *B60L 50/70* (2019.02); *B60L 58/30* (2019.02); *B64D 41/00* (2013.01); *H01M 8/04111* (2013.01); *H01M 8/04425* (2013.01); *B60L 2200/10* (2013.01); *B64D 2041/005* (2013.01); *H01M 2250/20* (2013.01)

(58) Field of Classification Search
CPC ...................... H01M 8/04753; H01M 8/04395
See application file for complete search history.

(56) References Cited

U.S. PATENT DOCUMENTS 5,991,670 A    11/1999    Mufford et al.

FOREIGN PATENT DOCUMENTS

| DE | 102015223716 A1 | 12/2016 |
| EP | 3611787 A2 | 2/2020 |
| EP | 3611787 A3 | 3/2020 |

OTHER PUBLICATIONS

EP 3611787 English translation obtained via Google Patents Mar. 9, 2023 (Year: 2020).*
European Search Report in related European Patent Application No. 22177356.7 dated Nov. 14, 2022, 4 pages.
European Exam Report in related European Patent Application No. 22177356.7 dated Dec. 12, 2022, 6 pages.

* cited by examiner

*Primary Examiner* — Sarah A. Slifka
(74) *Attorney, Agent, or Firm* — Lightfoot & Alford PLLC (57) ABSTRACT

A method of operating an aircraft includes providing a fuel cell system to power the aircraft, providing an airflow path through the fuel cell system, sensing a change mass air flow rate supplied to a compressor of the fuel cell system, and at least one of adjusting a restriction of airflow entering the airflow path in response to the sensed change in mass air flow rate, adjusting a restriction of airflow exiting the airflow path in response to the sensed change in mass air flow rate, and adjusting an air scoop to gather a different amount of air into the airflow path. A method of operating an aircraft includes sensing a change in ambient pressure supplied to an airflow path and adjusting a restriction of airflow exiting the airflow path in response to a sensed change in ambient pressure.

20 Claims, 8 Drawing Sheets

FUEL CELL CATHODE AIR PRESSURE MANAGEMENT SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Some aircraft rely on an onboard fuel cell system as an electricity power-source for powering the aircraft. In some fuel cell systems, output voltage of the fuel cell system is highly dependent on a supply air pressure provided to a cathode of the fuel cell system. Most generally, with decreased pressure provided to the cathode, a substantially predictable reduction in fuel cell output voltage results. Further, some fuel cell systems utilize compressors to maintain a desired air pressure supplied to the cathode. Importantly, conventional fuel cell systems generally fail when compressors of the fuel cell systems fail.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure provides an electric-powered aircraft and an associated fuel cell system. The fuel cell systems disclosed herein can comprise one or more components and functionality to provide relatively higher gas pressure to a cathode of the fuel cell system as compared to conventional fuel cell systems. These features can included controlling an air outlet of a fuel cell system, passing ram air through the fuel cell system compressor in instances of compressor failure, routing around a failed fuel cell system compressor, and combinations thereof.

Figure 1:
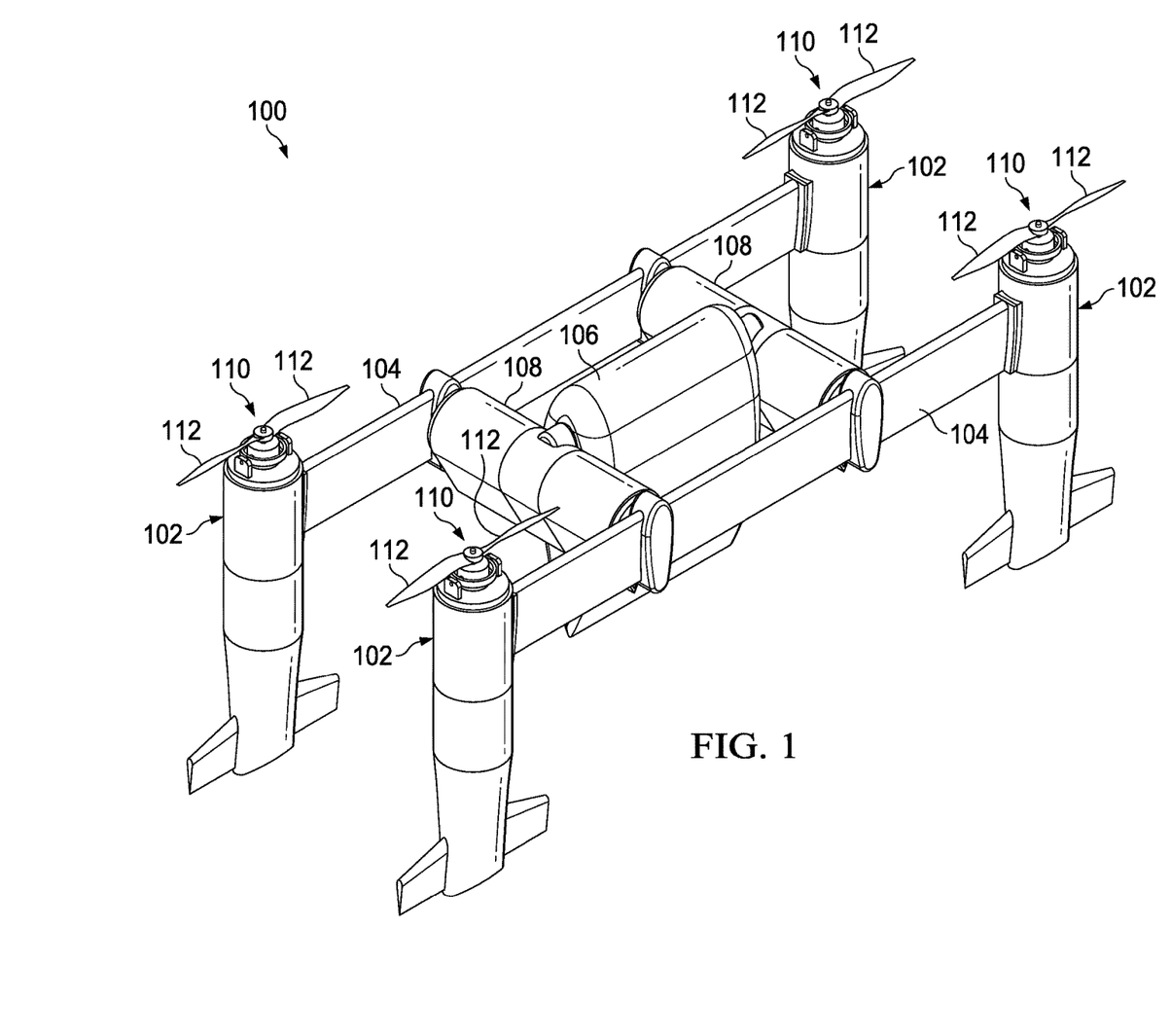
FIG. 1 illustrates an oblique view of an aircraft according to an embodiment of this disclosure.

FIG. 1 illustrates an oblique view of a tailsitter unmanned aerial vehicle ("UAV") 100 operable to transition between thrust-borne lift in a vertical takeoff and landing ("VTOL") orientation and wing-borne lift in a biplane orientation. In some embodiments, UAV 100 is a Bell Autonomous Pod Transport ("APT") aircraft. In the VTOL orientation, thrust modules 102 provide thrust-borne lift and, in the biplane orientation, thrust modules 102 provide forward thrust and the forward airspeed of UAV 100 provides wing-borne lift. Thrust modules 102 are mounted to wings 104, which generate lift responsive to forward airspeed when the UAV 100 is in the biplane orientation. Wings 104 are mounted to a payload 106 of UAV 100 by trusses 108. Each thrust module 102 includes a rotor assembly 110 with propellers 112 configured to rotate to provide thrust and direct ram air and propeller wash toward thrust module 102.

Figure 2:
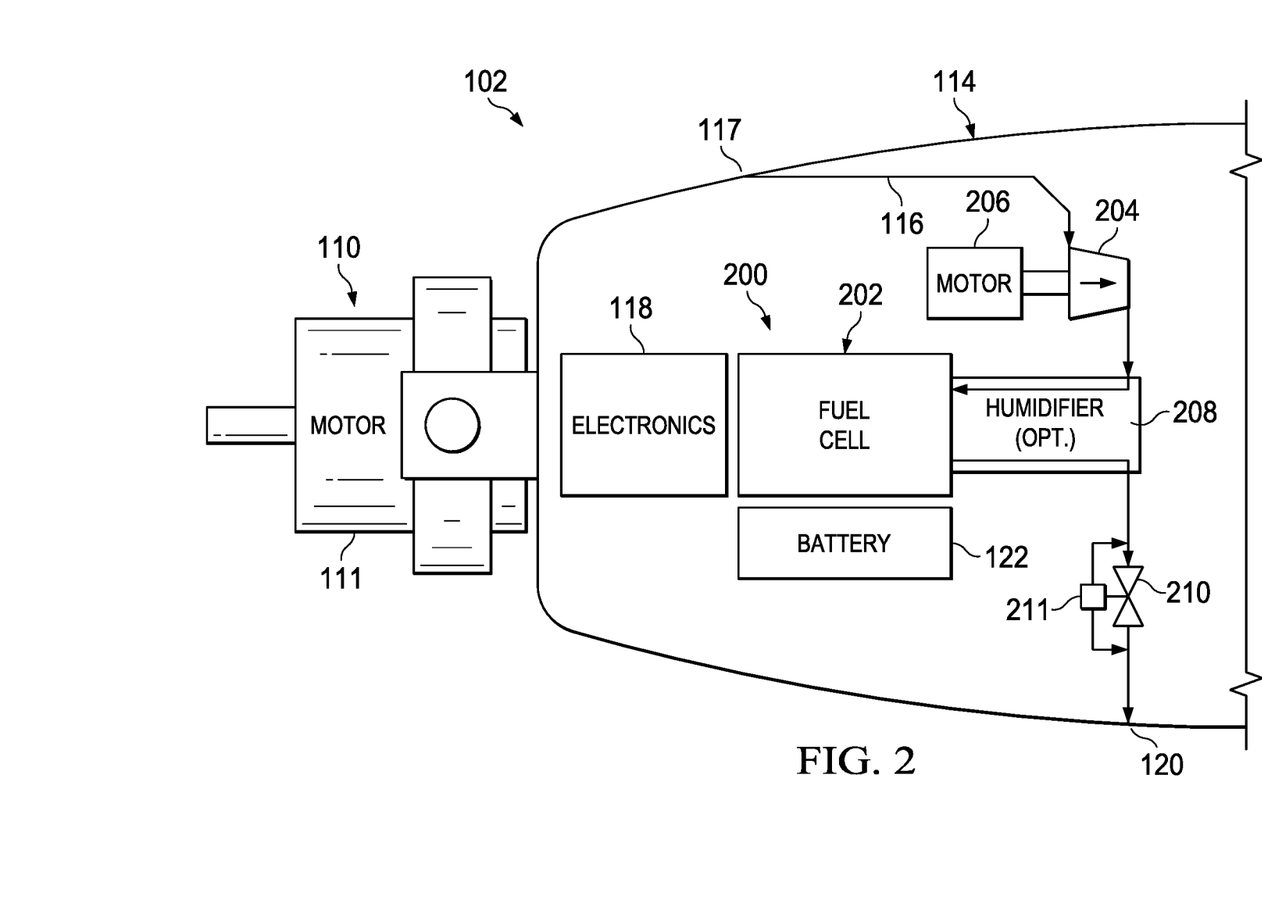
FIG. 2 illustrates a cutaway view of a nacelle of the aircraft of FIG. 1.

Referring to FIG. 2, each thrust module 102 includes a nacelle 114 which houses a passive ram air path 116 configured to direct passive ambient air from outside of UAV 100 toward a fuel cell system 200. In some cases, the air flowing through path 116 can be ram air that enters path 116 based on dynamic pressure created by the motion of UAV 100. In some cases, the air flowing through path 116 can be propeller wash displaced by propellers 112. In some cases, air flowing through path 116 is a combination of ram air and propeller wash. Although this disclosure refers to the air passing through path 116 as "ram air," one with skill in the art will understand that any of a number of sources can force air through path 116, such propeller wash displaced by rotor assembly 110.

Operation of thrust module 102 and fuel cell system 200 can be controlled by electronics node 118. Electronics node 118 preferably includes non-transitory computer readable media including a set of computer instructions executable by one or more processors for controlling operation of the thrust module 102 and fuel cell system 200. Fuel cell system 200 is configured to provide electrical power to thrust module 102 to power electric motor 111 of rotor assembly 110 and/or other components while also charging a battery 122. In this embodiment, fuel cell system 200 comprises fuel cell 202 that comprises a cathode 203, a compressor 204 powered by a motor 206, an optional humidifier 208 through which path 116 may pass, and an outlet pressure regulator 210. Most generally, air can be moved through thrust module 102 by entering the nacelle 114 at inlet 117 of path 116 and exiting the nacelle 114 at an outlet 120 of path 116. In this embodiment, fuel cell system 200 can supply electrical power to any of the thrust module 102 components selectively and simultaneously.

In operation of thrust module 102, it is important that sufficient gas or air pressure be provided to cathode 203 of fuel cell 202. Accordingly, fuel cell system 200 is provided with the outlet pressure regulator 210. Outlet pressure regulator 210 comprises a controller 211 that selectively actuates a valve of outlet pressure regulator 210 as a function of one or more indicators of altitude. For example, in some cases, the controller 211 can comprise an atmospheric pressure sensor and/or actuation device that supplies the movement and/or signals required to adjust the outlet pressure regulator 210. The outlet pressure regulator 210 may also be referred to as a back pressure valve and the outlet pressure regulator 210 can be electronically controlled by the controller 211. Alternatively, the controller 211 can comprise a passive pressure balanced unit that requires no active control signal to adjust the outlet pressure regulator 210.

In operation, the fuel cell system 200 can provide improved consistency in performance even as the fuel cell system 200 enters atmospheric zones of lower pressure, such high altitudes. Fuel cell system 200 can better maintain cathode reactant air supply pressure even at those higher altitudes. By combining ram air to the compressor with an altitude compensating outlet pressure regulator 210, fuel cell system 200 performance can be preserved as altitude increases. Maintaining performance will allow for greater flight endurance and enable an expanded flight envelope to be achieved.

In operation, ram air enters path 116 from an inlet 117 and travels along an air path 116 and exits path 116 at an outlet 120. Accordingly, ram air travels along and/or through path 116 from inlet 117 to compressor 204, from compressor 204 to a cathode of fuel cell 202 (optionally via humidifier 208), from fuel cell 202 to outlet pressure regulator 210 (optionally via humidifier 208) and from outlet pressure regulator 210 to outlet 120. By controlling outlet pressure regulator 210 to reduce a mass flow rate of gasses through outlet pressure regulator 210 in response to a lower environmental pressure and/or higher altitude, a pressure supplied to the cathode can be maintained better than if no outlet pressure compensation were made.

Figure 3:
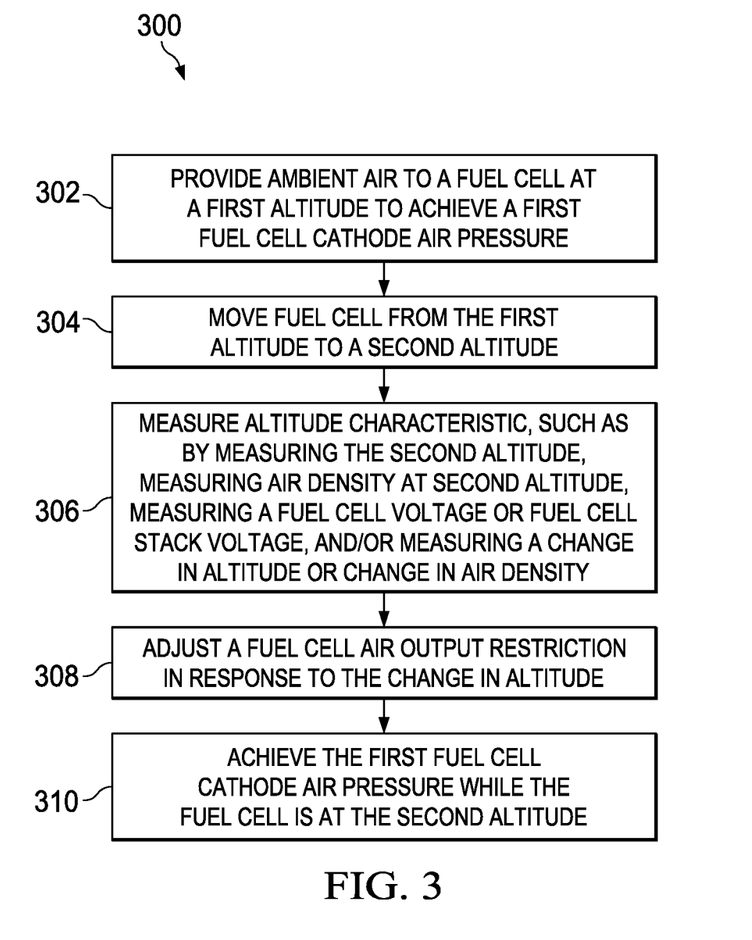
FIG. 3 is a flowchart of a method of operating the aircraft of FIG. 1.

Referring now to FIG. 3, a flowchart of a method 300 of operating a fuel cell system such as fuel cell system 200 is shown. The method 300 can begin at block 302 by providing ambient air to a fuel cell at a first altitude to achieve a first fuel cell cathode pressure. Next, at block 304 the method 300 can continue by moving the fuel cell system from the first altitude to a second altitude. The method 300 can continue at block 306 by measuring altitude characteristic, such as by measuring or sensing the second altitude, measuring air density at second altitude, and/or measuring a change in altitude or change in air density. In some embodiments, the altitude characteristic can be measured and/or determined by sensing or measuring an operating voltage of a fuel cell stack and/or of an individual fuel cell while the fuel cell system operates under a known electrical load and thereafter determining an altitude as a function of the measured voltage. In other words, in cases where the fuel cell system is adequately modeled so that known loads present known voltages, variations in the expected voltage can be attributed to operation at different altitudes and/or ambient pressures. With known relationships between cell or cathode pressures and altitude or ambient pressure (assuming a known electrical load), a fuel cell system of the sort disclosed herein can operate to selectively adjust airflow as a function of fuel cell system voltages as a proxy for directly measuring air pressures as indicators of altitude and without requiring extraneous altitude sensors and/or systems. At block 308, a fuel cell system air output restriction can be adjusted in response to the change in altitude. Method 300 can finish at block 310 by achieving the first fuel cell cathode air pressure while the fuel cell is at the second altitude.

Figure 4:
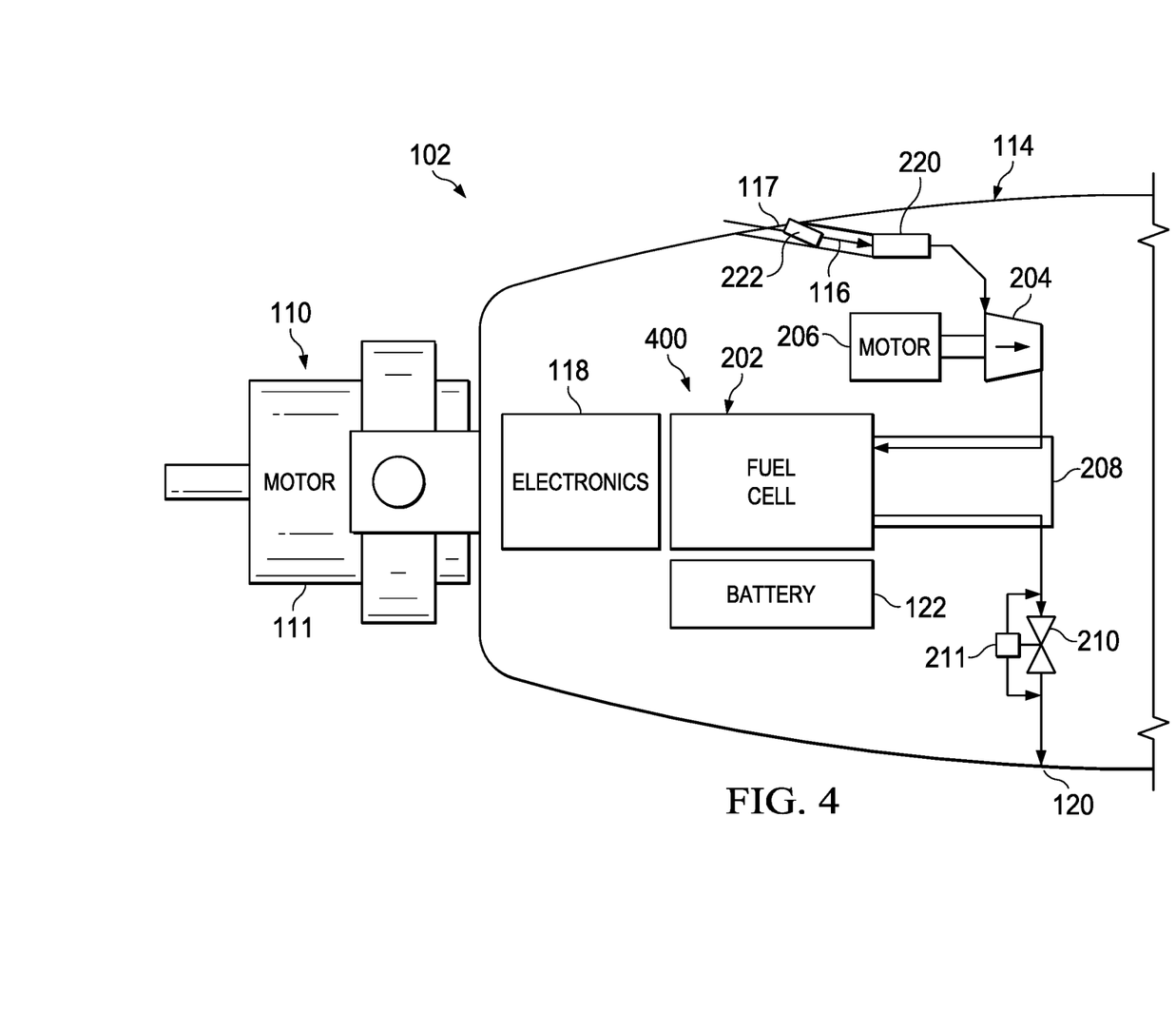
FIG. 4 illustrates a cutaway view of an alternative embodiment of a nacelle according to this disclosure.

Referring to FIG. 4, thrust module 102 is shown as comprising a fuel cell system 400 that is substantially similar to fuel cell system 200. However, fuel cell system 400 further comprises a flow meter 220 disposed between inlet 117 and compressor 204 and an air valve or air scoop 222 disposed to affect an amount of air gathered into the path 116 at the inlet 117. In this embodiment, air scoop 222 is configured to selectively extend beyond a profile of the nacelle 114. In some embodiments, the flow meter 220 can provide data or other outputs that affect control of the air scoop 222. For example, in cases of motor 206 or compressor 204 failure or degradation, the flow meter 220 can sense a lower than desired mass air flow rate and in response, move the air scoop 222 to scoop more air toward inlet 117, thereby increasing pressure and mass air flow rate provided to or through compressor. In this manner, compressor failures can be at least partially compensated for by scooping more air into path 116. Accordingly, fuel cell system 400 provides a previously unavailable means of increasing pressure supplied to a cathode of a fuel cell system.

Figure 5:
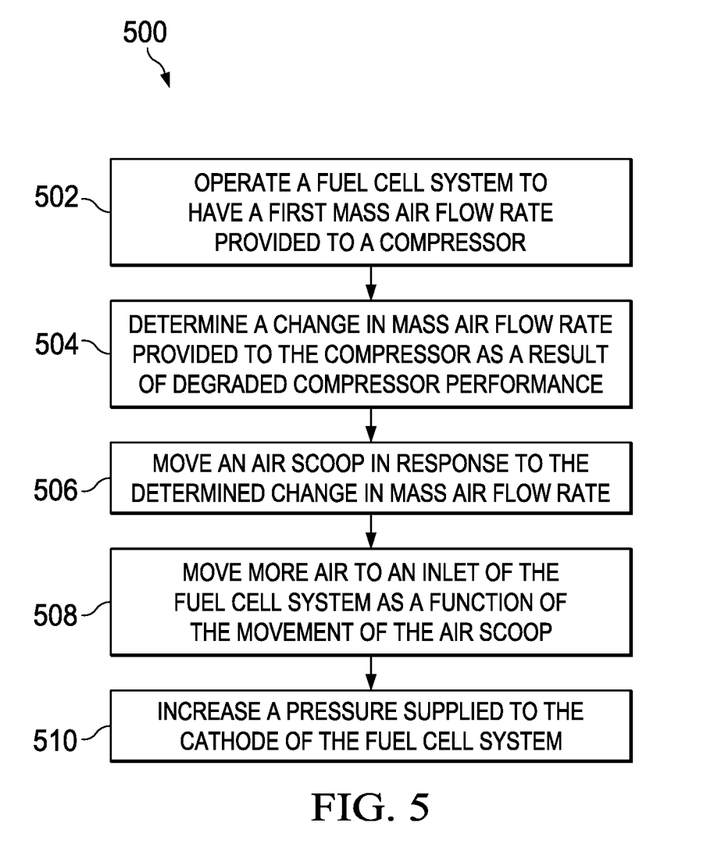
FIG. 5 is a flowchart of a method of operating an aircraft comprising the nacelle of FIG. 4.

Referring now to FIG. 5, a flowchart of a method 500 of operating a fuel cell system such as fuel cell system 400 is shown. The method 500 can begin at block 502 by operating a fuel cell system to have a first mass air flow rate provided to a compressor. Next, at block 504 the method 500 can continue determining a change in mass air flow rate provided to the compressor as a result of a degraded compressor performance. The method 500 can continue at block 506 by Moving an air scoop in response to the determined change in mass air flow rate. Next at block 508, the method 500 can move more air to an inlet of the fuel cell system as a function of the movement of the air scoop. The method 500 can continue at block 510 by increasing a pressure supplied to the cathode of the fuel cell system. In this manner, a fuel cell system 400 can compensate for a poorly performing compressor.

Figure 6:
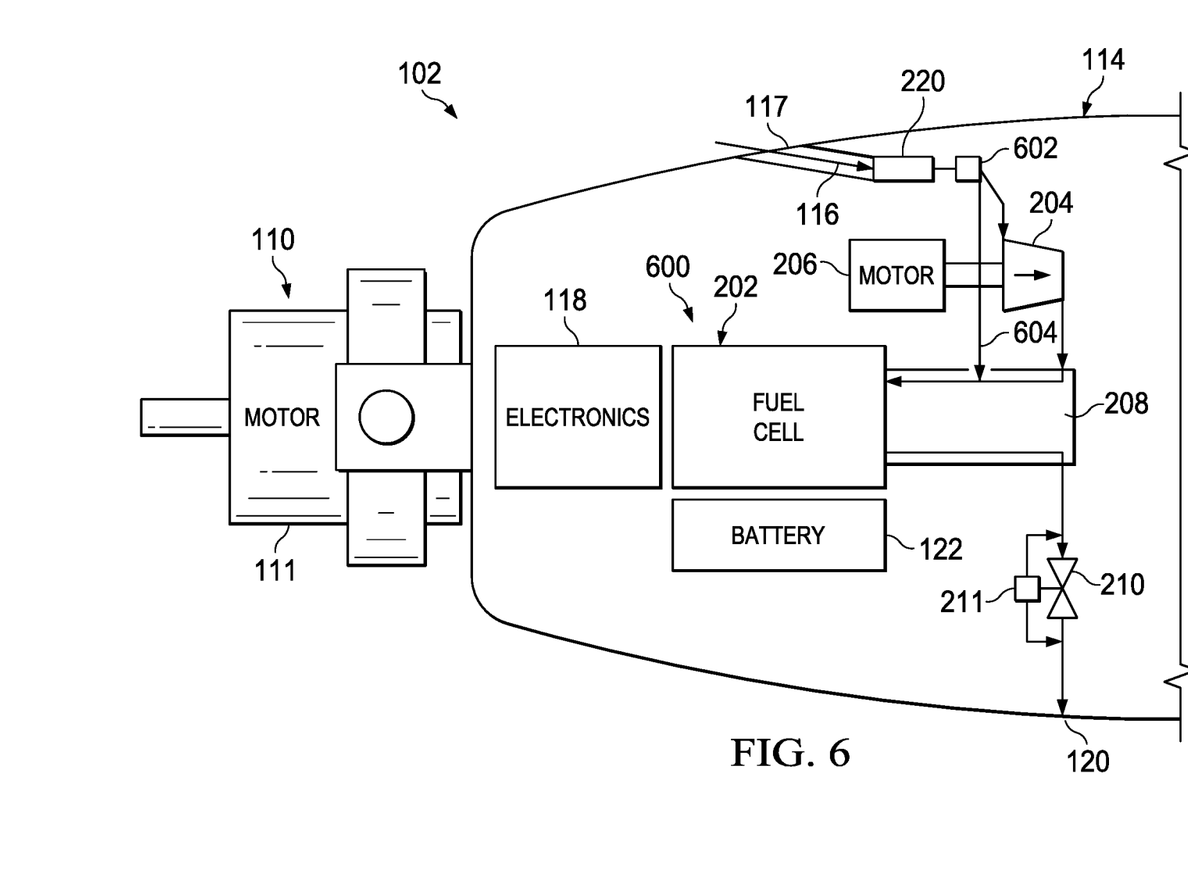
FIG. 6 illustrates a cutaway view of another alternative embodiment of a nacelle according to this disclosure.

Referring to FIG. 6, thrust module 102 is shown as comprising a fuel cell system 600 that is substantially similar to fuel cell system 400. However, fuel cell system 600 does not comprise an air scoop 222 and further comprises a pressure activated flow diverter 602. In cases where the flow meter 220 senses a change in pressure between the flow meter 220 and the flow diverter 602 that indicates a failure of the compressor 204, the flow diverter 602 can be actuated by an actuator to cause the airflow to bypass the compressor 204 and flow through a bypass line 604 to the cathode of the fuel cell 202 instead of through the compressor 204. In this manner, compressor failures can be at least partially compensated for by bypassing the compressor 204 and allowing an improved pressure supplied to the cathode. Accordingly, fuel cell system 400 provides another previously unavailable means of increasing pressure supplied to a cathode of a fuel cell system.

Figure 7:
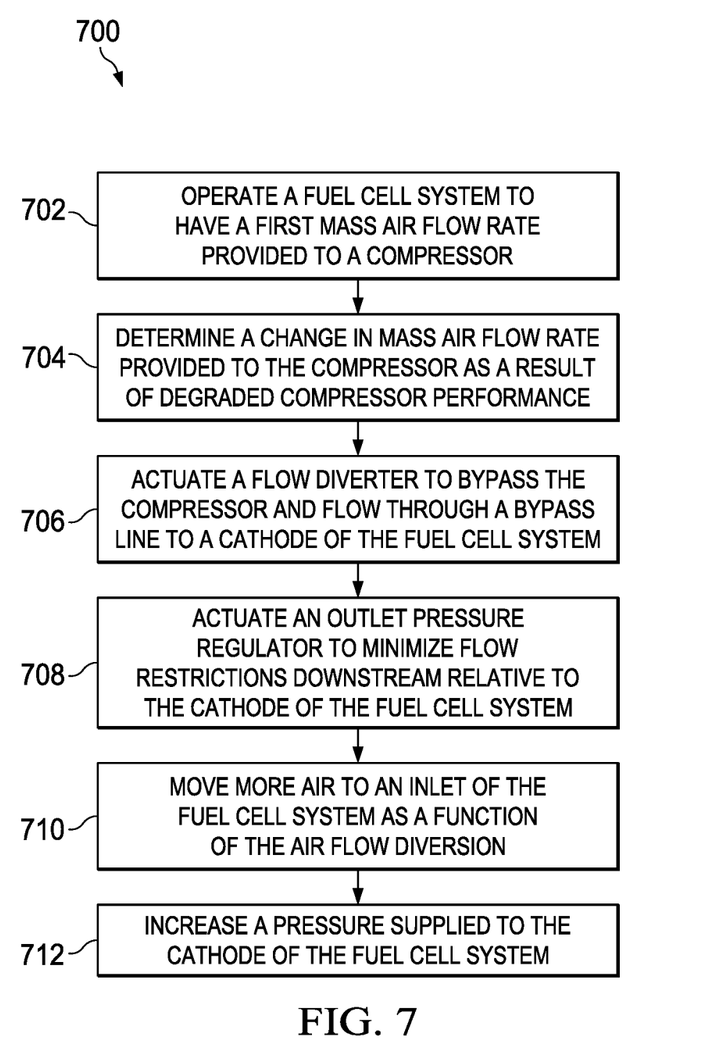
FIG. 7 is a flowchart of a method of operating an aircraft comprising the nacelle of FIG. 6.

Referring now to FIG. 7, a flowchart of a method 700 of operating a fuel cell system such as fuel cell system 500 is shown. The method 700 can begin at block 702 by operating a fuel cell system to have a first mass air flow rate provided to a compressor. Next, at block 704 the method 700 can continue determining a change in mass air flow rate provided to the compressor as a result of a degraded compressor performance. The method 700 can continue at block 706 by actuating a flow diverter to bypass the compressor and flow through a bypass line to a cathode of the fuel cell system. At block 708, method 700 can continue by reducing or removing airflow restrictions downstream relative to the cathode of the fuel cell system. In some cases, such a reduction in airflow restrictions can comprise operating a controller such as controller 211 to fully open an outlet pressure regulator such as outlet pressure regulator 210 so that air passes through the outlet pressure regulator with as little restriction as possible. Next at block 710, the method 700 can move more air to an inlet of the fuel cell system as a function of the movement of the air flow diversion. The method 700 can continue at block 712 by increasing a pressure supplied to the cathode of the fuel cell system. In this manner, a fuel cell system 500 can compensate for a poorly performing compressor.

Figure 8:
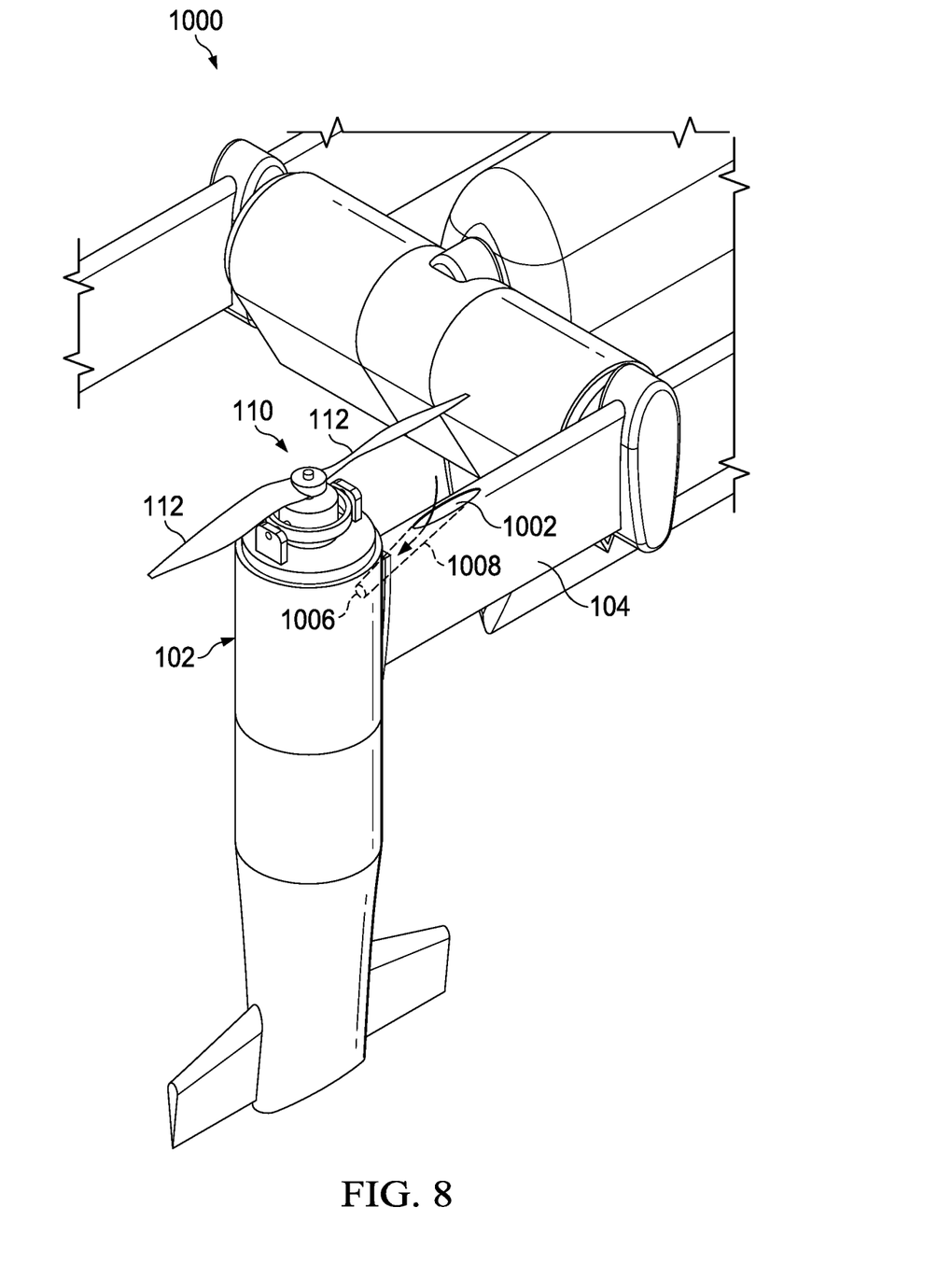
FIG. 8 illustrates an oblique partial view of an aircraft according to another embodiment of this disclosure.

Referring now to FIG. 8, an oblique view of an alternative embodiment of a tailsitter unmanned aerial vehicle ("UAV") 1000 operable to transition between thrust-borne lift in a vertical takeoff and landing ("VTOL") orientation and wing-borne lift in a biplane orientation. In some embodiments, UAV 1000 is a Bell Autonomous Pod Transport ("APT") aircraft. In the VTOL orientation, thrust modules 102 provide thrust-borne lift and, in the biplane orientation, thrust modules 102 provide forward thrust and the forward airspeed of UAV 100 provides wing-borne lift. Thrust modules 102 are mounted to wings 104, which generate lift responsive to forward airspeed when the UAV 100 is in the biplane orientation. Wings 104 are mounted to a payload 106 of UAV 100 by trusses 108. Each thrust module 102 includes a rotor assembly 110 with propellers 112 configured to rotate to provide thrust and direct ram air and propeller wash toward thrust module 102. UAV 1000 differs from UAV 100 insofar as UAV 1000 further or alternatively comprises a wing air inlet 1002 disposed on a leading edge of the wing 104 and the wing air inlet 1002 is in fluid communication with an alternative air supply inlet 1006. The alternative air supply inlet 1006 is configured to receive ram air and/or propeller wash via a wing duct 1008. In some cases, the wing duct 1008 is located within the wing 104. It will be appreciated that in some embodiments, air supplied from the wing can be mixed with air obtained via inlet 117. However, in other cases, the air supplied from the wing can fully replace the air otherwise obtained via inlet 117.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A method of operating an aircraft, comprising:
providing a fuel cell system to power the aircraft;
providing an airflow path through the fuel cell system;
sensing a change in ambient pressure supplied to airflow path;
determining a degraded performance of a compressor configured to provide airflow to a cathode of the fuel cell system; and
adjusting a restriction of airflow exiting the airflow path in response to the sensed change in ambient pressure.

2. The method of claim 1,
wherein the sensed change in ambient pressure is a function of a change in altitude of the fuel cell system.

3. The method of claim 1, wherein the restriction is adjusted to increase a gas pressure supplied to a cathode of the fuel cell system.

4. The method of claim 1, wherein the restriction adjustment is accomplished by an outlet flow regulator.

5. The method of claim 1, wherein the outlet flow regulator is controlled by a controller that controls the outlet flow regulator as a function of information sensed or received by the controller.

6. The method of claim 5, wherein the controller comprises a passive pressure balanced unit that requires no active control signal.

7. The method of claim 1, wherein the air supplied to the airflow path is ram air.

8. A method of operating an aircraft, comprising:
providing a fuel cell system to power the aircraft;
providing an airflow path through the fuel cell system;
sensing a change mass air flow rate supplied to a compressor of the fuel cell system;
at least one of adjusting a restriction of airflow entering the airflow path in response to the sensed change in mass air flow rate, adjusting a restriction of airflow exiting the airflow path in response to the sensed change in mass air flow rate, and adjusting an air scoop to gather a different amount of air into the airflow path;
determining a degraded performance of the compressor configured to provide airflow to a cathode of the fuel cell system; and
in response to determining the degraded performance of the compressor, increasing airflow to the cathode of the fuel cell by means other than increasing compressor performance.

9. The method of claim 8,
wherein the sensed change in mass air flow rate is a function of change in performance of the compressor.

10. The method of claim 8, wherein the restriction is adjusted to increase a gas pressure supplied to a cathode of the fuel cell system.

11. The method of claim 8, wherein the restriction adjustment is accomplished by an outlet flow regulator.

12. The method of claim 8, wherein the outlet flow regulator is controlled by a controller that controls the outlet flow regulator as a function of information sensed or received by the controller.

13. The method of claim 12, wherein the controller comprises a passive pressure balanced unit that requires no active control signal.

14. The method of claim 8, wherein the air supplied to the airflow path is ram air.

15. The method of claim 1, wherein the mass air flow rate information is obtained by a flow meter disposed between an inlet of the airflow path and the compressor.

16. A method of operating an aircraft, comprising:
providing a fuel cell system to power the aircraft;
providing an airflow path through the fuel cell system;
sensing a change mass air flow rate supplied to a compressor of the fuel cell system; and
in response to the sensed change in mass air flow rate, diverting the airflow path away from the compressor and through a bypass line to the cathode of the fuel cell;
determining a degraded performance of the compressor configured to provide airflow to a cathode of the fuel cell system; and
in response to determining the degraded performance of the compressor, increasing airflow to the cathode of the fuel cell by means other than increasing compressor performance.

17. The method of claim 16,
wherein the sensed change in mass air flow rate is a function of change in performance of the compressor.

18. The method of claim 16, wherein the restriction is adjusted to increase a gas pressure supplied to a cathode of the fuel cell system.

19. The method of claim 16, wherein the flow diverter is electronically controlled by information received by a flow meter.

20. The method of claim 16, wherein the flow diverter comprises a passive pressure balanced unit that requires no active control signal.

* * * * *